Patented May 15, 1934

1,958,609

UNITED STATES PATENT OFFICE 1,958,609

HYPNOTIC PREPARATION

Walter G. Christiansen, Glen Ridge, N. J., and Alfred E. Jurist, Brooklyn, N. Y., assignors to E. R. Squibb & Sons, New York, N. Y., a corporation of New York No Drawing. Application January 15, 1932, Serial No. 586,955

4 Claims. (Cl. 167—52)

This invention relates to hypnotic preparations, and has for its object the provision of a hypnotic preparation characterized by ease of manufacture, stability toward the heat of sterilization and during storage, exceptional suitability for injection, and promptness of soporific action.

The preparation made in accordance with this invention comprises an aqueous solution of ethylisopropyl barbituric acid and diethanolamin, the solutes being preferably in the approximate proportion of at least two molecules of the latter to one of the former, the molecular excess of diethanolamin being increased as the concentration of ethylisopropyl barbituric acid is increased. Such a preparation is not decomposed by the heat employed in sterilization; does not degenerate during the extended period of storage at room temperature that often elapses between manufacture and use; can, by reason of its relatively low alkalinity and other properties, be administered hypodermically, intravenously, or intramuscularly, without danger of tissue destruction; and quickly induces sleep.

As an example, 100 cc. of water containing 10 g. of ethylisopropyl barbituric acid and 15 g. of diethanolamin (the ethylisopropyl barbituric acid and diethanolamin being present, accordingly, in the approximate proportion of one to three molecules, respectively), is heated to the boiling point, and then allowed to stand overnight. Crystals that have separated out are redissolved at, or at slightly below, room temperature by adding, in small portions and with shaking, the requisite amount of water. The solution—of which the ethylisopropyl barbituric acid constitutes approximately 5.35 percent—is then ampuled, and sterilized at 122° C. for half an hour. Analysis of such a solution after sterilization, shows it to be entirely unimpaired by the heat employed; and, in an aging test, an assay and examination made nine months after preparation, revealed that the solution had undergone no change in the interim.

For a solution of which the ethylisopropyl barbituric acid is to constitute two percent, only two molecules of diethanolamin are necessary for each molecule of ethylisopropyl barbituric acid.

It will be understood that the foregoing embodiments are merely illustrative and not limitative of the invention, which may assume various other forms within the scope of the appended claims.

We claim:

1. A hypnotic preparation comprising an aqueous solution of ethylisopropyl barbituric acid and diethanolamin, the number of molecules of the latter solute being substantially greater than that of the former.

2. A hypnotic preparation comprising an aqueous solution of ethylisopropyl barbituric acid and diethanolamin, the solutes being in the approximate proportion of at least two molecules of the latter to one of the former.

3. A hypnotic preparation comprising an aqueous solution of ethylisopropyl barbituric acid and diethanolamin, the solutes being in the approximate proportion of two molecules of the latter to one of the former.

4. A hypnotic preparation comprising an aqueous solution of ethylisopropyl barbituric acid and diethanolamin, the solutes being in the approximate proportion of three molecules of the latter to one of the former.

WALTER G. CHRISTIANSEN.
ALFRED E. JURIST.